April 23, 1940.  D. H. COCKBURN  2,198,526
MACHINE FOR CUTTING GRASS
Filed Nov. 1, 1938   2 Sheets-Sheet 2
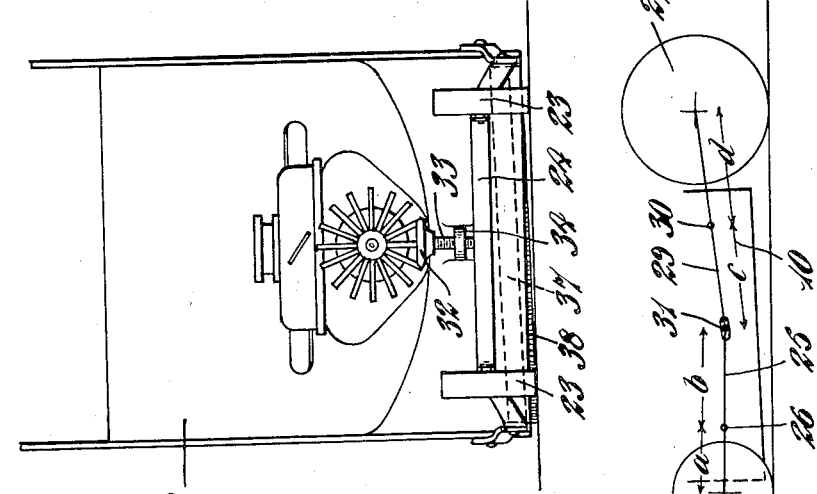
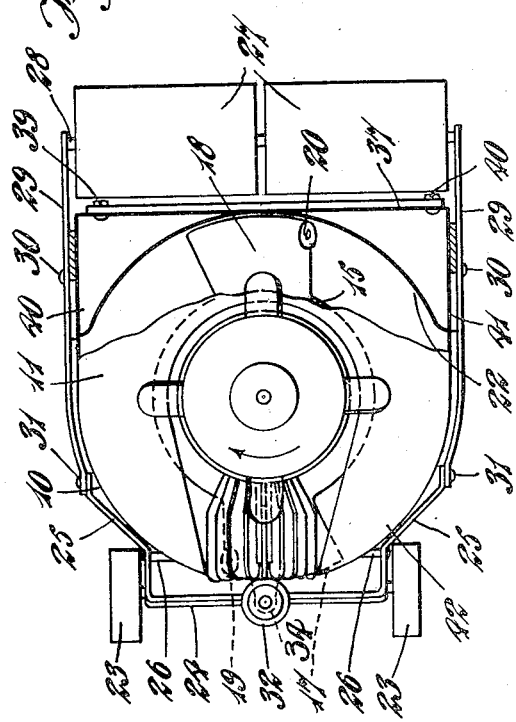
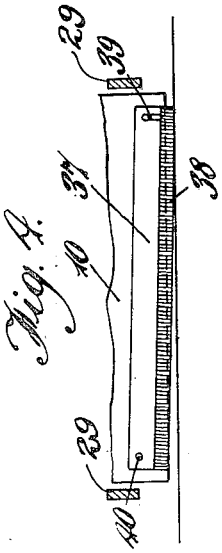
D. H. Cockburn
By: Stevens and Davis
Attorneys Patented Apr. 23, 1940

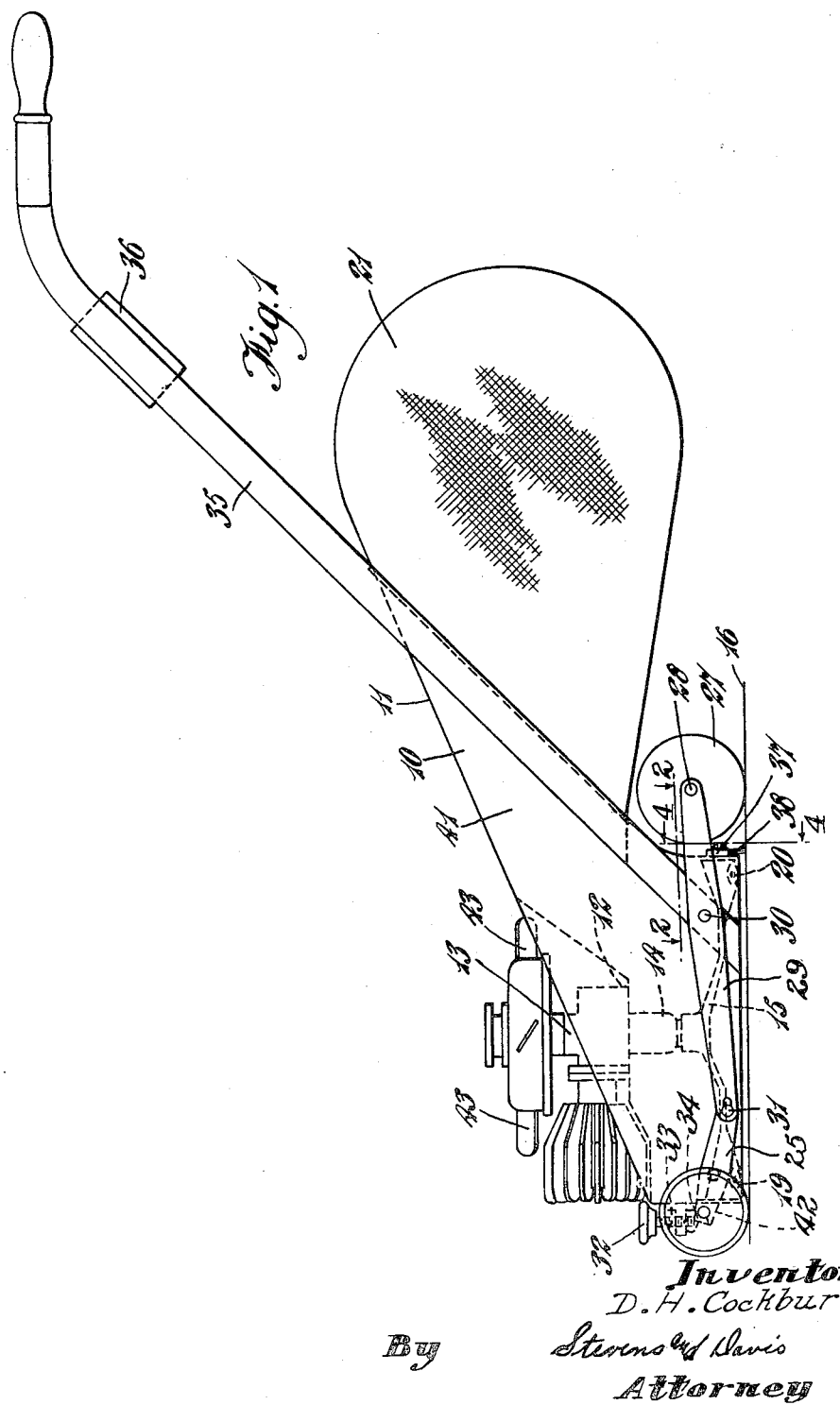

2,198,526

UNITED STATES PATENT OFFICE 2,198,526

MACHINE FOR CUTTING GRASS

David Hamilton Cockburn, Iver, England, assignor of one-half to Power Specialties Limited, Maidenhead, England Application November 1, 1938, Serial No. 238,281
In Great Britain December 7, 1937

7 Claims. (Cl. 56—25.4)

This invention relates to machines for cutting grass, and particularly to those of the kind in which a blade or cutter is driven so that it rotates about a substantially vertical axis, i. e., rotates in a plane substantially parallel with the ground surface, said blade or cutter being covered by a casing and preferably being arranged to generate an upward current of air so that the cut grass is carried upwards and can be caused to flow into a suitable receptacle.

It is the primary object of the present invention to provide an improved construction of machine incorporating means whereby the height of the cutter from the ground surface can be easily regulated, preferably in such a manner that the plane of rotation of the cutter is automatically regulated so that it best suits the length to which the grass is being cut. For example, when the machine is being used to trim a fine lawn the plane of rotation of the cutter should be practically parallel with the ground's surface to ensure that all of the grass blades are cut off to substantially the same length. When cutting long grass, however, it is desirable that the plane of rotation should be tilted somewhat so that there is a greater ground clearance at the rear of the cutter than at the front, as this to a large exent avoids trouble due to the clogging of the cutter by the grass.

In a grass cutting machine having a cutter arranged to rotate in a plane substantially parallel with the ground surface and comprising a casing with supporting means at its front and rear, the present invention is characterised by the fact that said supporting means are mechanically coupled together so as to be adjusted simultaneously relatively to the casing by a common regulating device. Thus there is provided in accordance with the invention a grass cutting machine having a cutter arranged to rotate in a plane substantially parallel with the ground surface and covered by a casing which carries the cutter and its driving means, said casing being provided with supporting wheels or equivalent disposed at the front and rear of the casing, which wheels or equivalent are connected adjustably to said casing and are arranged with a common regulating device adapted to change simultaneously the position of the front and also of the rear supporting means relative to the casing.

According to the invention there is further provided a grass cutting machine comprising in combination a casing having vertical side wells merging into a front which is semi-circular in plan, the upper part of said casing being sloped downwards to the front, a vertical shaft which is driven by a motor and which carries at its lower end a cutter adapted to rotate in a substantially horizontal plane, supporting means at the front and the rear of the casing, and adjusting means which act simultaneously upon the supporting means at the front and the rear so as to raise and lower the casing bodily relative to the ground surface. The upper part of the casing can conveniently be formed with a recess within which the driving motor is disposed. In order to enable the machine to operate as smoothly as possible for all positions of the regulating device, the supporting means at the rear of the casing are preferably arranged to move through a greater distance than the front supporting means for a given movement of said regulating device, the latter conveniently comprising a single handle or equivalent which serves to adjust simultaneously the whole of the supporting means at the front and the rear of the casing. In the preferred arrangement the front supporting means are carried by a lever mechanism which is interconnected with a secondary lever mechanism carrying the rear supporting means. Thus the front supporting means can comprise a U-shaped member, each of the limbs of which carries a roller or equivalent at one end and is connected with the secondary lever mechanism at the other end, the intermediate part of said limb being pivotally connected to the casing about a horizontal axis. This enables a regulating device to operate upon the centre of the U-shaped member for the purpose of providing a single point adjustment. The rear supporting means may comprise a roller extending for the whole width of the casing and carried upon the rear ends of a pair of secondary levers, the intermediate parts of which are pivoted to the casing, while their front extremities are connected operatively with the regulating device. If desired there may be provided adjacent the rear supporting means a depending transverse brush adapted to stroke the grass after cutting so that it is directed forwardly, said brush being secured to the casing so as to enable its height to be adjusted. Thus the brush may be pivoted at one end to the casing and at its other end may be attached thereto by a slotted connection allowing vertical adjustment so that the degree of tilting may be varied to suit the prevailing conditions.

A machine according to the invention is illustrated by way of example in the accompanying drawings, in which:

Figure 1 is a side elevation;

Figure 2 is a fragmentary plan view of the machine with the casing partly broken away at the rear to show the relationship of an impeller blade to the rest of the mechanism, the horizontal plane of the break being indicated at line 2—2 of Figure 1;

Figure 3 is a front view of the machine, the operating handles being broken away;

Figure 4 is a fragmentary vertical section on line 4—4 of Figure 1 showing the method of attaching the transverse brush; and Figure 5 is a diagram of one embodiment of the linkage, which interconnects the front and rear supporting means.

The grass cutting machine shown in the drawings comprises a casing 10, the upper surface 11 of which slopes downwards to the front. The upper part 11 of the casing is substantially plane, except that it is formed at its centre part with a depression or recess 12 for the accommodation of an internal combustion engine 13 or other convenient driving means, such as an electric motor. The sides of the casing, which are indicated at 40 and 41, are vertical and merge forwardly into a front portion 42 which is semicircular in plan as will be seen in Figure 2. The shaft of the engine 13 is indicated at 14 and is arranged vertically, a combined cutter holder and impeller 15 being secured to the lower edge of said shaft so as to rotate in a plane which is substantially parallel with the surface 16 of the ground. The cutter holder 15 is formed at two diametrically opposite points with obliquely disposed impeller blades 17 and 18, which are adapted to create an upward current of air when the cutter holder 15 is driven, and which also carry cutters 19 and 20 in the form of steel discs sharpened around their edges. The impeller blades 17 and 18 and the cutters 19 and 20 are illustrated in a somewhat diagrammatic fashion here since the particular structure of these elements is relatively immaterial to this invention. The nature and relationship of these parts are shown and described in detail in my prior Patent 2,071,872, dated February 23, 1937. Thus as the machine is moved over the surface of the ground while the engine 13 is running the cutters 19 and 20 trim the grass, while the blades of the latter are being drawn upwardly by the induced draft of air, so ensuring efficient cutting and causing the particles of grass which are removed to be drawn upwardly through the casing 10 and deposited in a perforated grass box 21 fitted to the rear of the machine. That part of the bottom of the casing 10 which is swept by the combined cutter holder and impeller 15 is formed with a circular opening 22, so that the cutter holder and impeller 15 is completely covered in when the machine is in operation. In the example shown the engine 13 is provided with fan blades 43 to create a downward draught of air which sweeps through the recess 12 and past the engine cylinder so as to cool the latter.

To support the machine the casing 10 is fitted at its front with a pair of wheels 23 which are journalled in a U-shaped member 24 extending around the front part of the casing. The limbs 25 of the member 24 are themselves pivoted, each intermediate its length, to a lug 26 upon the casing 10. The rear part of the casing 10 is supported by a roller 27, which can conveniently be formed in two or more individual sections, said roller being freely mounted upon a spindle 28 which is secured to the rear extremities of a pair of secondary levers 29, said levers being pivoted at 30 to the casing and being coupled at their forward ends by a pin and slot connection 31 to the rear ends of the limbs 25. The adjustment of the front supporting means 23 and the rear supporting means 27 is carried out simultaneously by manipulating a single hand wheel 32 having a screw-threaded stem 33 which passes through a bracket 34 upon the casing, and which at its lower end bears against the centre of the U-shaped member 24. By screwing down the hand wheel 32 the wheels 23 are depressed, thus in effect raising the front of the casing. At the same time the pin and slot connections 31 are moved upwardly relative to the casing, so that the secondary levers 29 serve also to depress the spindle 28 carrying the rear roller 27, thus also lifting the rear part of the casing 10. It will be readily apparent that by suitably arranging the lengths and the pivots of the limbs 25 and the secondary levers 29, the casing 10 may be arranged to lift more at its rear than at its front part. This effect is found to be advantageous, as a fine lawn is best mown by having the cutters 19 and 20 rotating in a plane which is parallel to the surface of the ground, but for cutting longer grass a freer action is obtained by inclining the plane of rotation so that its rear part is higher than the front. This result is obtained by having the bottom of the casing 10 parallel to the ground when said casing is in its lowest position and arranging the limbs 25 and the secondary levers 29 to depress the roller 27 to a greater extent than the wheels 23 are depressed during the operation of the hand wheel 32. Thus in Figure 5, which represents diagrammatically the linkage on each side of the machine, the desired effect is obtained by making the lengths $a$, $b$, $c$, and $d$, such that $b.d./a.c.$ is greater than unity. A convenient value is one and one-third. It will be noted that the relationship among the lever arms of members 25 and 29 is different in the embodiments illustrated in Figures 1 and 5. These two figures are not intended to relate to identical structures, but instead, illustrate the manner in which the adjustable parts may be varied within the scope of the invention to adapt the device to special purposes.

Referring to the embodiment illustrated in Figure 1, it will be seen that the ratios of the lever arms of the series are such that the ratio corresponding to the value $bd/ac$ of Figure 5 is slightly greater than unity. Rotation of the hand-wheel 32 in a direction to depress the forward wheels 23 relative to the casing 10 will cause the rear end of member 25 to rise relative to the casing 10 and thereby move the forward end of member 29 through the linkage at 31. It will be apparent that the rear end of member 29 will move downward relative to the frame simultaneous with the similar movement of the forward end of member 25. Thus the forward rolling members and the rear rolling members are mounted on supports adjustable with respect to the frame, which supports are mechanically connected by a transmission device such as the lever arms 25 and 29 for simultaneous movement in the same direction with respect to said frame. These essential features of the invention may be modified within the scope of the invention to make it possible to vary the ratio of movement of the rear and forward rolling members relative to the frame. This type of construction is illustrated in Figure 5, wherein a device for causing considerably greater relative movement of the rear rolling members is shown diagrammatically.

It is well known that the direction in which the surface of a lawn is cut governs to a slight extent the colour of the grass when viewed from any particular point, and this accounts for the striped appearance of a lawn which has been freshly trimmed with a machine of the cylinder type. Owing to the horizontal rotation of the cutters in the present form of machine the colour effect tends to vary across the width of the machine, because for the direction of rotation shown in Figure 2, the grass on the left-hand side is being cut in a forward direction, while the grass on the right-hand side is being cut rearwardly. To make the colour effect of the grass uniform a brush comprising a strip 37 fitted with bristles 38 is secured across the back of the casing 10 as shown principally in Figure 4, which is a rear elevation. As the grass on the left-hand side of the machine is already facing forwardly there is no need for it to be treated further, but the grass on the right-hand side is stroked forwardly by the bristles 38 as the machine passes along, thus causing all the grass blades to lie in one direction. The brush 37, 38 is disposed obliquely as shown and can conveniently be fitted with a pivotal connection 40 on the left-hand side and with a screw and slot connection 39 on the right-hand side, in order that the elevation of the brush can be readily modified to suit different lawn surfaces and to compensate for wear of the bristles 38.

It will be apparent to those skilled in the art that the essence of this invention lies in the provision of a roller carried frame for a lawn mower of the type having a substantially horizontal rotary cutter, which frame is provided with front and rear rollers rotatably mounted on adjustable supports for the frame and having said adjustable supports interconnected by a transmission to operate simultaneously. In the preferred embodiment of the invention illustrated here, the adjustable supports are constituted by members 25 and 29. It is clear that the specific nature of the supporting members and the linkage causing simultaneous adjustment may be varied by the substitution of known mechanical equivalents for the elements shown. The specific disclosure hereof is intended as an illustration of one operative embodiment of the invention which is not limited except by the scope and spirit of the appended claims.

The improved construction of machine is extremely simple to operate and has been found to be satisfactory in service.

What I claim is:

1. In a grass cutting machine having a rotary cutter mounted in a frame to move in a substantially horizontal plane in the lower part of said frame, forward rolling members connected to said frame by a forward adjustable support, rear rolling members connected to said frame by a rear adjustable support, a mechanical transmission connected to each of said adjustable supports for simultaneous movement of said supports in the same general direction with respect to said frame and a manually operable regulator for said adjustable supports.

2. In a grass cutting machine having a rotary cutter mounted in a frame to move in a substantially horizontal plane in the lower part of said frame, forward rolling members connected to said frame by a forward adjustable support, rear rolling members connected to said frame by a rear adjustable support, a mechanical transmission connected to each of said adjustable supports for simultaneous movement of said supports in the same general direction with respect to said frame, the relative movement of said rear rolling members being greater than that of said forward rolling members, and a manually operable regulator for said adjustable supports.

3. In a grass cutting machine having a rotary cutter mounted in a frame to move in a substantially horizontal plane in the lower part of said frame, forward adjusting levers pivotally connected intermediate their ends to the forward part of said frame, forward rolling members on the forward ends of said levers, rear adjusting levers pivotally connected intermediate their ends to the rear part of said frame, rear rolling members on the rear ends of said rear levers, and a mechanical connection between the adjacent ends of corresponding forward and rear adjusting levers to cause said adjacent ends to move together.

4. In a grass cutting machine having a rotary cutter mounted in a frame to move in a substantially horizontal plane in the lower half of said frame, forward adjusting levers pivotally connected intermediate their ends to the forward part of said frame, forward rolling members on the forward ends of said levers, rear adjusting levers pivotally connected intermediate their ends to the rear part of said frame, rear rolling members on the rear ends of said rear levers, and a pivotal connection between the adjacent ends of corresponding forward and rear adjusting levers, the respective points of pivotal attachment of said forward and rear adjusting levers to said frame being such that the relative movement of said rear rolling members with respect to the frame is greater than the relative movement of said forward rolling members with respect to the frame.

5. In a grass cutting machine having a rotary cutter mounted in a frame to move in a substantially horizontal plane in the lower part of said frame, forward adjusting levers pivotally connected intermediate their ends to the forward part of said frame, forward rolling members on the forward ends of said levers, rear adjusting levers pivotally connected intermediate their ends to the rear part of the frame, rear rolling members on the rear ends of said rear levers, and a mechanical connection between the adjacent ends of corresponding forward and rear adjusting levers comprising a pin on one of said levers operating in a slot in the other of said levers.

6. In a grass cutting machine having a rotary cutter mounted in a frame to move in a substantially horizontal plane in the lower part of said frame, forward adjusting levers pivotally connected intermediate their ends to the forward part of said frame, forward rolling members on the forward ends of said levers, rear adjusting levers pivotally connected intermediate their ends to the rear part of the frame, rear rolling members on the rear ends of said rear levers, and a mechanical connection between the adjacent ends of corresponding forward and rear adjusting levers comprising a pin on one of said levers operating in a slot in the other of said levers, the respective points of pivotal attachment of said forward and rear adjusting levers being such that the relative movement of said rear rolling members with respect to the frame is greater than the relative movement of said forward rolling members with respect to the frame.

7. In a grass cutting machine having a cutter arranged to rotate in a horizontal plane, and driving means for said cutter, a casing which is formed with a rounded forward portion sloping uniformly upward toward the rear, the lower part of said casing having an opening within which the cutter operates and the forward wall being formed with a recess housing said driving means, a transverse brush secured to the rear of the casing to brush the trimmed grass in a uniform forward direction, forward rolling members connected to said casing by a forward adjustable support, rear rolling members connected to said casing by a rear adjustable support, and a mechanical transmission connected to each of said adjustable supports for simultaneous movement of said supports in the same general direction with respect to said frame.

D. H. COCKBURN.